L. J. MAUTNER.
APPARATUS FOR DETERMINING THE MOMENT WHEN A SHIP'S GUN PASSES THROUGH A PREDETERMINED ELEVATION.
APPLICATION FILED APR. 3, 1912.

1,035,122.

Patented Aug. 6, 1912.

WITNESSES

INVENTOR
LUDWIG JOSEF MAUTNER

UNITED STATES PATENT OFFICE.

LUDWIG JOSEF MAUTNER, OF VIENNA, AUSTRIA-HUNGARY.

APPARATUS FOR DETERMINING THE MOMENT WHEN A SHIP'S GUN PASSES THROUGH A PREDETERMINED ELEVATION.

1,035,122.    Specification of Letters Patent.    Patented Aug. 6, 1912.

Application filed April 3, 1912. Serial No. 688,231.

*To all whom it may concern:*

Be it known that I, LUDWIG JOSEF MAUTNER, a subject of the Emperor of Austria-Hungary, residing at Vienna, Empire of Austria-Hungary, have invented certain new and useful Improvements in Apparatus for Determining the Moment when a Ship's Gun Passes Through a Predetermined Elevation; and I do hereby declare the following to be a full, clear, and exact description of the invention, such as will enable others skilled in the art to which it appertains to make and use the same.

In a known apparatus for determining the moment when a ship's gun passes through a predetermined elevation a slide having straight parallel lines drawn on it is adjustable along an arc of a circle adapted to turn around an axis permanently parallel to the axis of the bore of the gun such axis being mounted on a portion of the gun carriage not taking part in the recoil. The arrangement of the parts is such that the said straight parallel lines are vertical when the arc is in a vertical plane, the ship is on an even keel and the gun has the predetermined elevation corresponding to the adjustment of the slide on the arc. A plumb line is suspended on the slide or on the arc so that when the ship rolls the moment when the gun passes through the elevation corresponding to the adjustment of the slide on the arc is indicated by the fact that the plumb line becomes parallel to the lines drawn on the slide. The arc is held in a vertical plane by hand. According to the present invention this apparatus is improved in the direction that for the plumb line a ball, roller or other solid of revolution is substituted which is compelled to move along a guide in the form of an arc of a circle, such arc being held in a vertical plane. The solid of revolution therefore moves under exactly the same conditions as if it were attached to a wire or cord suspended in the center of the arc shaped guide and thus did constitute a plumb line, but the wire or cord is dispensed with. Thereby the space required for the apparatus is greatly reduced and its strength notably increased. At the moment when the gun passes through the predetermined elevation the solid of revolution comes exactly in front of the slide which constitutes a convenient and reliable means for accurately ascertaining this moment.

Figure 1:
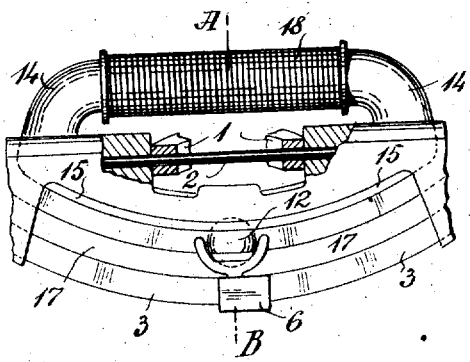
Figure 2:
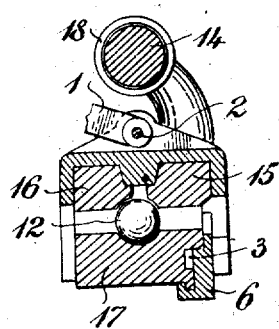

In the drawing by way of example a constructional form of the apparatus embodying this invention is shown in Figure 1 in side elevation and in Fig. 2 in transverse section on the line A B, Fig. 1.

A shaft 2 permanently parallel to the axis of the bore of the gun is journaled in a frame 1 secured to a portion of the gun carriage not taking part in the recoil. This shaft carries a guide 15, 16, 17 in the form of an arc of a circle along which a ball 12 or a roller or other solid of revolution is free to move. Along a graduated arc 3 provided on the guide a slide 6 is adjustable. By properly turning the guide around the geometrical axis of the shaft 2 the plane of such guide can be maintained vertical at all times notwithstanding any rolling or other oscillatory movements of the ship and this vertical plane is then also parallel to the vertical plane through the axis of the bore of the gun (that is to say to the plane of the trajectory of the projectile, if deviation is neglected). The geometrical axis of the arc shaped guide is then horizontal and normal to this plane. The slide 6 is adjusted on the graduated arc 3 according to the elevation desired, that is to say so that this slide is at the lowest point of the graduated arc when the plane of the arc shaped guide is vertical and the shaft 2 and therefore also the axis of the bore of the gun makes the desired angle of elevation with the horizon. Hence when the ship oscillates the slide 6 will move to and fro in front of the ball 12 which is always at the lowest point of the arc shaped guide. Therefore at the moment when the slide is exactly opposite the ball the gun passes through the predetermined elevation and at this moment the gun has to be fired. For facilitating the observation of the coincidence of the ball, roller or other solid of revolution the upper part of the slide may be made in the form of a fork or other suitable form or it may be provided with a hair cross.

The ball roller or other solid of revolution may repose on the arc shaped guide simply owing to gravity but it is preferred to suspend it magnetically as shown in the drawing, pole pieces 15, 16 of a magnet core 14 which are curved on an arc of a circle and located side by side holding attracted the ball roller or other solid of revolution which then consists of iron. 18 indicates a coil on the core 14 and serving for magnetizing the same. In any case the guide must be so shaped that it prevents the ball, roller or other solid of revolution from falling out in the event of shocks. Besides when the magnetic suspension above described is used care must be taken that the ball, roller or other solid of revolution even if it should fall down from the pole pieces is attracted again at once by them.

Claims:

1. In an apparatus for determining the moment when a ship's gun passes through a predetermined elevation the combination of a guide shaped to the arc of a circle and adapted to turn around an axis parallel to the axis of the bore of the gun, a body adapted to move freely along such guide under the action of gravity and a slide adjustable along such guide, substantially as and for the purpose described.

2. In an apparatus for determining the moment when a ship's gun passes through a predetermined elevation the combination of a guide shaped to the arc of a circle and adapted to turn around an axis parallel to the axis of the bore of the gun, a solid of revolution adapted to roll freely along such guide under the action of gravity and a slide adjustable along such guide, substantially as and for the purpose described.

3. In an apparatus for determining the moment when a ship's gun passes through a predetermined elevation, the combination of a magnet having pole pieces located side by side parallel to each other and curved to the arc of a circle whereby they constitute a guide, such magnet and guide being adapted to turn around an axis parallel to the axis of the bore of the gun a magnetic solid of revolution adapted to be held attracted by such guide and to move freely along such guide under the action of gravity and a slide adjustable along such guide, substantially as and for the purpose described.

In testimony whereof, I affix my signature, in presence of two witnesses.

LUDWIG JOSEF MAUTNER.

Witnesses:
  ARTHUR BAUMANN,
  ADA MARIA BERGER.